Figure 1:
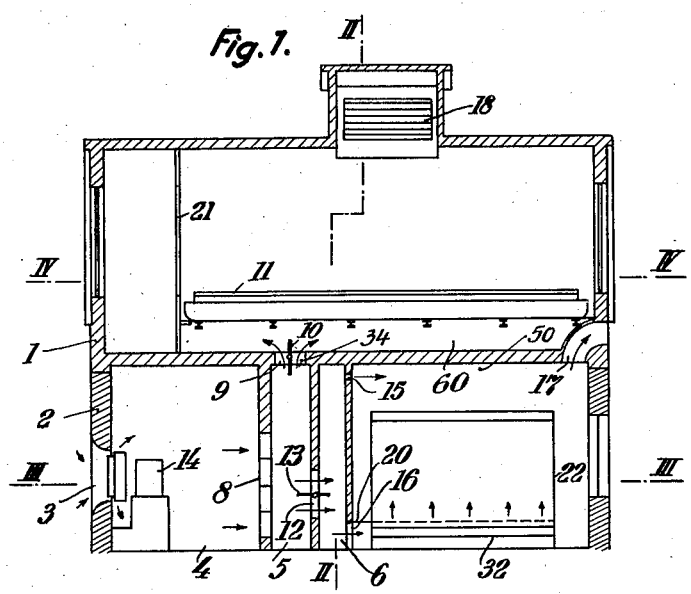

May 14, 1935.  K. BARTH ET AL  2,001,564

APPARATUS FOR AERATING BEER WORT

Filed Dec. 14, 1931  5 Sheets-Sheet 1

Inventors:
Karl Barth, Karl Schuler
and Julius Wanger
by C. P. Goepel
their Atty.

May 14, 1935. K. BARTH ET AL 2,001,564
APPARATUS FOR AERATING BEER WORT
Filed Dec. 14, 1931 5 Sheets-Sheet 2
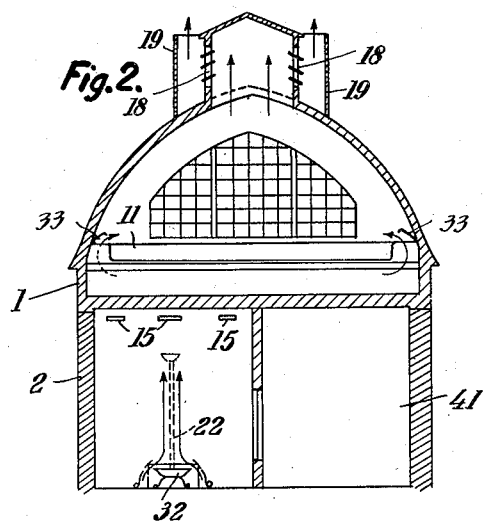
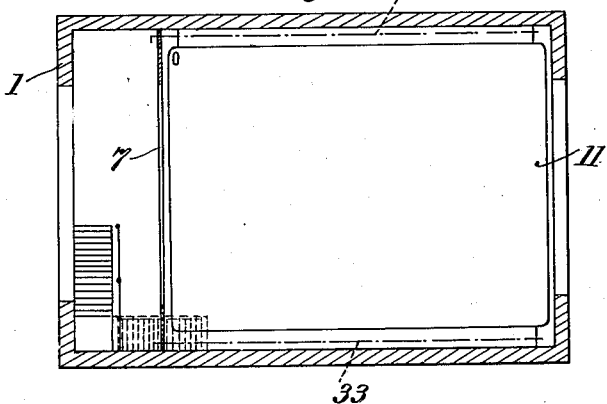
Inventors:
Karl Barth, Karl Schuler
and Julius Wanger
by C. P. Boefel
their Atty.

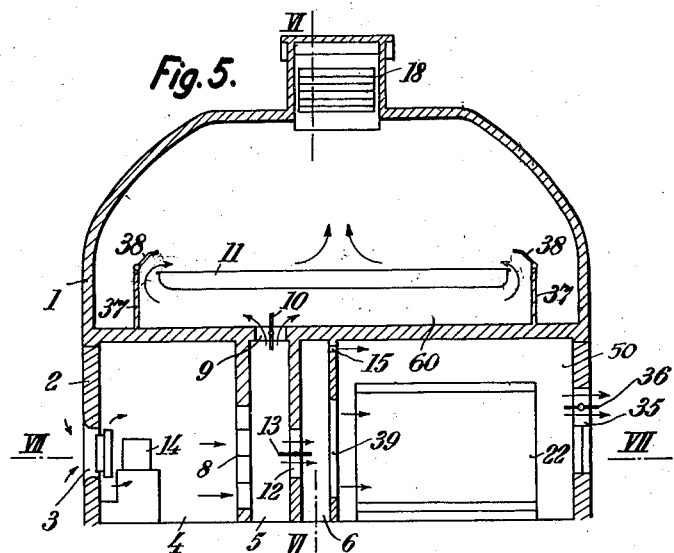
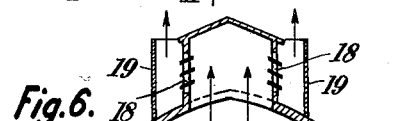
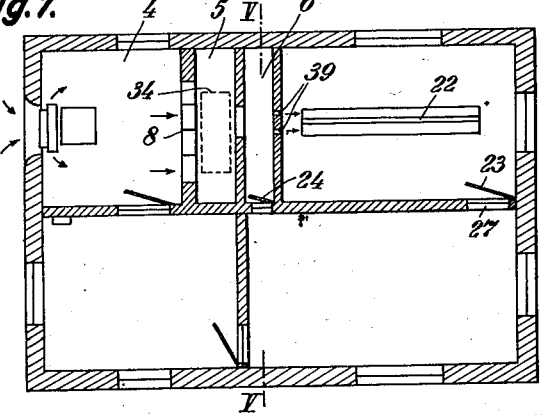

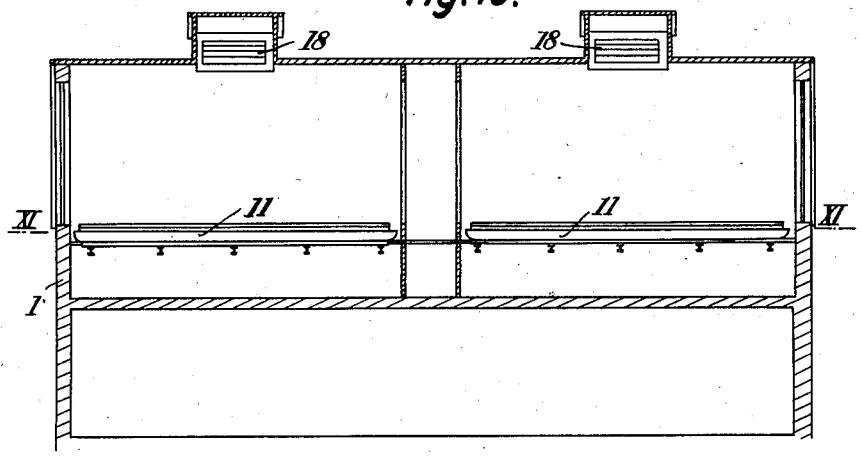
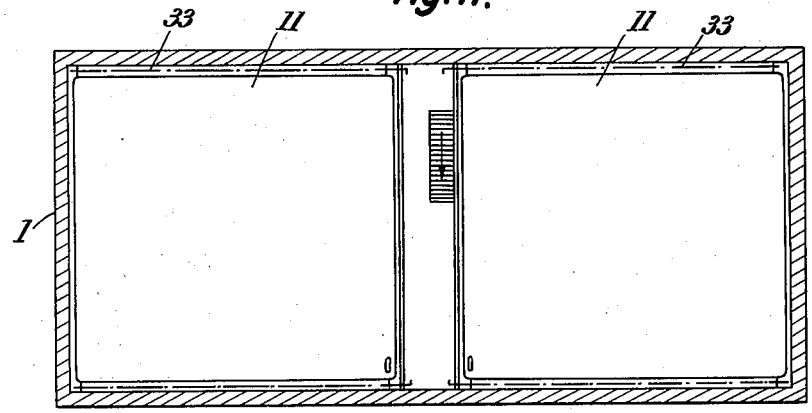

Patented May 14, 1935

2,001,564

UNITED STATES PATENT OFFICE 2,001,564

APPARATUS FOR AERATING BEER WORT

Karl Barth and Karl Schuler, Munich, and Julius Wanger, Aubing, Germany

Application December 14, 1931, Serial No. 580,828

6 Claims. (Cl. 261—119)

Our invention relates to a novel apparatus for aerating beer wort in breweries and consists essentially therein that the surface of the wort is exposed to the action of germ-free air at over-pressure. Further novel features of our invention consist in the provision of special apparatus and in the application of special methods for treating the wort in the aforementioned manner.

Our invention makes use of the fact that open cooling floors and open spray-coolers are expedients well-known in the art of brewing, especially for the reason that with apparatus of the kind the wort will be kept in contact with large quantities of fresh air and the treatment of the wort may be carried out slowly and continuously. Our invention is further based on the experience that the treatment of the wort with germ-free air must be carried out in open cooling floors and open spray-coolers, because otherwise eventually large quantities of injurious spores or disease germs may come into action to unfavorably affect the process of brewing and to impair the quality of the beer, such as rendering the same cloudy or unable to be kept sound for any length of time.

According to our invention we propose to close up the spaces in which the wort is treated within so-called open cooling floors and to supply germ-free air at over-pressure to said spaces in a quantity larger than the quantity of air which may escape at normal pressure through leaks or apertures. More particularly, according to our invention the germ-free air is preferably brought into contact with the surface of the wort and carried along said surface in such a way that said air is caused to propagate or spread in the form of a veil or blanket along the surface of the wort. This procedure may be carried out irrespective of whether the surface of the wort is positioned vertically, as is the case with open spray-coolers, or whether the wort presents an horizontal surface, as in case of open cooling floors.

The plants in which the process of treating the wort is carried out according to our invention may be constructed in various ways. A main feature of a wort treatment plant constructed according to our present invention, accordingly, consists therein that we arrange said plant within a closed space which may either be large or small in accordance with the size of the plant.

In case of large plants and consequently large closed treatment spaces, according to our invention it will be preferable to subdivide the treatment space in a special manner. We have found that in such case it will be of advantage to provide vertical or horizontal narrow slots or rows of slots at the walls of said closed treatment space and in proximity to the surface of the wort and to use pressure chambers outside of said treatment space, said pressure chambers serving for the reception of germ-free pressure air permitting the latter to pass through the aforementioned slots or rows of slots and to propagate or spread in the form of a veil alongside the surface of the spray of wort, in case of an open spray-cooler, or above the surface of the wort, in case a cooling floor is used. The air subsequent to propagating along the surface of the wort will thus be caused to be distributed throughout the closed treatment space and eventually also pass along the ceiling or cover of the space, thus putting the entire treatment space under over-pressure. The air may thereupon be discharged, if so desired, at special places.

It is also possible to branch off from the start of this procedure parts of the germ-free treatment air and to carry these parts of air through the treatment space along the ceiling in order to keep the latter in dry condition. The ceiling of the treatment space according to our invention may also be constructed in the form of a cupola which will serve to prevent water dropping from the ceiling and to facilitate conveying of the air currents towards the outlets.

In the accompanying drawings which form part of the specification we have represented a number of examples of apparatus for carrying our invention into effect.

Figure 3:
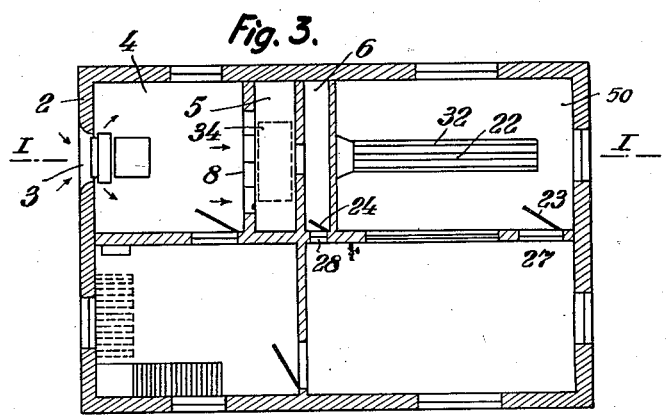
Figure 8:
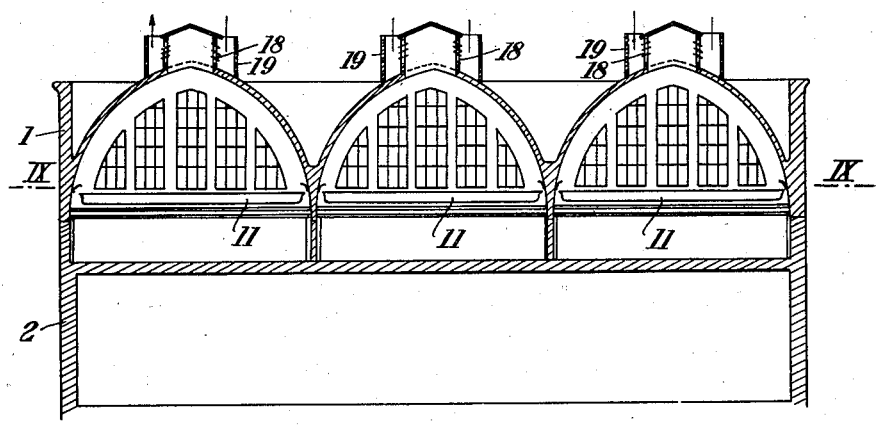
Figure 9:
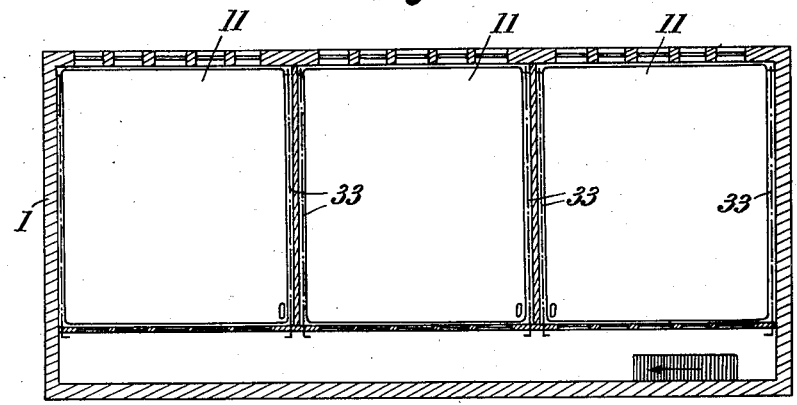

In the drawings Fig. 1 is a vertical section through a wort treatment plant constructed according to our invention, Fig. 2 a transverse section along line II—II of Fig. 1, Fig. 3 a transverse section along line III—III of Fig. 1, the line I—I in Fig. 3 indicating the section according to Fig. 1, Fig. 4 a transverse section along line IV—IV of Fig. 1, Fig. 5 a vertical section through a modified wort treatment plant constructed according to our invention, Fig. 6 a transverse section along line VI—VI of Fig. 5, Fig. 7 is a plan view taken on line VII—VII of Fig. 5, Fig. 8 a vertical section through another modification of the wort treatment plant according to our invention, Fig. 9 a transverse section or plan view along line IX—IX of Fig. 8, Fig. 10 a vertical section through a further modification of the plant comprising two cooling floors and Fig. 11 a transverse section along line XI—XI of Fig. 10.

Referring now more particularly to the drawings, Figs. 1, 2, 3 and 4 show several sections through the building 1 of a wort treatment plant and the apparatus which forms part thereof according to our invention, said building having preferably walls of which the several parts 2 are insulated in order that proper temperature conditions may be maintained in the several chambers of the plant in which different steps in the wort treatment process are being conducted. Within the treatment space 4 of the plant there is provided a fan 14 with the suction apertures 3. The wall 9 of the treatment space 4 is provided with perforations or apertures 8 which are filled up by germ-tight air filters. The space 5 is positioned in front of the space 4 and provided with air dampers or valves 13 and 10, of which the former is mounted within the aperture 12. Adjacent the space 5 there is a further space having an aperture 16 at its under wall and an aperture 17 at its upper wall. The valve 20 serves for closing up the aperture 16 and in open condition may also serve for passing a current of air into the space 50 comprising one of several wort treatment chambers provided in the plant. Within the space 50 there are mounted open spray-coolers 22 with under air supply channel 32 which are provided with rows of holes or slots permitting discharge of air in a direction opposite to the direction of the spray of wort trickling down from the cooler 22. These rows of holes or slots are not especially shown in the drawings. Air passing through aperture 16 is directed by the valve 20 into one end of the channel 32, the other end of which is closed so that the air is forced to travel upwardly through slots in the upper wall of the channel 32 and along the wort, as shown by arrows in Fig. 1. 17 is an air exhaust or discharge channel, 11 a cooling floor in the space 60 which constitutes another wort treatment chamber of the plant, 21 a separating wall, and 18 are air discharge valves which are provided within the roof of the building. The channel 17 is designed to discharge a portion of the air from the chamber 50 to the outside but in quantity such that proper pressure of air is maintained in the treatment rooms. If desired a conventional form of air valve may be used to control this passage, for instance, a valve such as the air valve 10. The air valve 10 serves to vary the size of the aperture 34. 23 is a door within the inlet 27 and 24 another door within the aperture 28, said latter door serving for purposes of cleaning.

In Fig. 2 the lateral protective walls in front of the air discharge valves 18 are shown at 19. The slots or apertures 15 are evenly distributed as may be seen from Fig. 2. The lateral regulating valves 33 serve to uniformly distribute the treatment air in the form of a veil along the surfaces of the wort in the cooling floors 11. There is further provided a chamber or side space 41 with valves 31 therein which may, for instance, serve to operate the cooling apparatus without entering the cooling space. The constructions of the wort treatment plant shown in Figs. 1, 2, 3 and 4 serve for carrying through the novel process of germ-free aeration which forms part of our present invention.

According to our invention now, the air, as shown by arrows, is drawn in by means of a fan 14 through the aperture 3 and pressed through the filters in the wall 8, where said air is freed from dust and other contaminations or impurities, such as spores, germs or the like. Eventually the air may be also preliminarily cooled and dried. Subsequently the air enters the space 5 from which it is distributed in accordance with the position of the air valves 13 and 10 in the apertures 12 and 34 to the space 60 underneath the cooling floor 11 and to the space 6, respectively. The spaces 5, 6, 60 and 50, therefore, will be permanently kept filled with germ-free air at over-pressure. This air may enter on the one hand the space 50 of the spray-cooler from the pressure chamber through the slots or rows of apertures in 32 forming air admission channels and on the other hand discharge through the aforementioned slots or apertures 15 which as shown in Fig. 2 are arranged in proximity to the ceiling for the purpose of maintaining the ceiling substantially free of moisture. By delivering the air under pressure to the space 7 it is obliged to travel across the underside of the cooling floor before being deflected into contact with the wort on the exposed upper surface of the floor. This arrangement insures a variable rate of cooling of the wort since the air is in a sense preheated by first coming in contact with the underside of the cooling floor to an extent dependent upon the prevailing temperature of the wort, and thus as the wort becomes cooler the air is preheated to a less extent and therefore has a greater cooling effect on the wort during the final stages of the process. From the pressure chamber underneath the cooling floor the germ-free air now may discharge along the aforementioned regulating valves 33 past the cooling floor.

From the drawings it may be seen that the space 50 which contains the spray-cooler as well as the space 60 which contains the cooling floor are closed all around. Furthermore the cross-section of the air discharge channel 17 as well as the cross-section of the air discharge valves 18 and 19 are smaller than the cross-section of the air admission channel. In consequence of this, the germ-free air will permanently be kept under over-pressure. In this manner provisions are made that air can only escape towards the outside through leaks, such as crevices at the windows and the like, thus avoiding with certainty any presence of impurities and germs in the air which serves for the treatment of the wort.

As the discharge apertures of the pressure chambers are of the form of slots or rows of holes, germ-free pressure air will enter the treatment space in the form of a veil or blanket and cover up the wort contained therein. More particularly, the germ-free pressure air will first pass along all cooling surfaces of the wort and thereupon fill up the treatment spaces owing to the over-pressure which is maintained according to our invention in the pressure chamber. Further air such as issuing from the slots 15 may be caused to pass along the ceiling of the treatment spaces— which air may also be pre-heated—in order to keep said ceiling, and especially the ceiling of the space in which the wort is treated by spray-coolers, in dry condition.

In the foregoing we have fully described the apparatus for the germ-free aeration of the wort as shown in Figs. 1-4 as well as the mode of operation of said apparatus, and therefore only a general description is given in the following for the examples of construction shown in Figs. 5-11.

Figs. 5, 6 and 7 show a construction of our wort treatment plant which comprises, instead of the air supply channels 32, slots 39 provided laterally in the wall of the pressure space 6, said slots leading to the space 50 which contains the spray-cooler. These slots are arranged in a direction parallel to the surface of the spray of wort within the cooler. Instead of the discharge aperture 17 the present construction comprises a discharge aperture 35 with a valve 36 therein. According to Figs. 5, 6 and 7 furthermore, the pressure chamber within the space for the cooling floor is laterally closed up not by walls extending upward as far as to the ceiling, but by means of the walls 37 which extend upward only within a part of the height of the treatment space, said walls 37 being provided with valves 38 at their upper ends. There is further provided a wall of masonry work at the two longitudinal edges of the cooling floor as shown in Fig. 6, said walls forming a pressure chamber underneath said cooling floor.

The further modified construction as shown in Figs. 8, 9, 10 and 11 is designed especially for large wort treatment plants. As shown in these figures, the treatment space is of the form of a large hall with rows of cooling floors, each row comprising three cooling floors. In order to maintain with certainty the over-pressure of the air within this hall and to be able to limit said over-pressure in an economical manner to that part of the plant in which it is desired at a time, according to our invention we propose to separate the several cooling floors from each other by transverse walls in a manner to produce several closed treatment spaces. There is further shown in Fig. 9 a wall positioned in proximity to the cooling floors and extending in longitudinal direction thereof, thus forming a separate passage or corridor from which the several cooling floors may be attended. In this manner there will be provided within the large hall longitudinal and transverse floors or passages closed all around permitting to carry out the process according to our invention within the several spaces of the hall without in any way disturbing the operation of the plant during attendance and by draft of air caused thereby. Furthermore the walls of the hall are provided with large panes or said walls may also be made entirely of glass permitting to easily and carefully supervise the several phases of the process within the several spaces for the cooling floors.

The mode of operation of the plant shown in Figs. 5, 6 and 7 and of the plant shown in Figs. 8, 9, 10 and 11 is not principally different from that of the plant shown in Figs. 1, 2, 3 and 4.

In Figs. 8, 9, 10 and 11 the air at over-pressure is admitted in substantially the same manner as described in connection with Figs. 1 and 2, that is, it is admitted beneath the cooling floor in each compartment and after passing along this floor it is directed over the upper surface of the wort in a continuous film overlying the entire extent of the surface of the wort and thence through the openings controlled by the dampers 18.

With respect to the channels, slots, air flaps and air discharge organs mentioned hereinabove we desire it to be understood that these devices have been mentioned for the purpose of exemplification only. Principally these devices may of course also be different from those described herein and shown in the drawings and modified in accordance with special requirements. Moreover, the aforementioned devices may be made of stone, sheet metal or any other structure materials. Also the construction and general arrangement of the above mentioned fan may be different from the construction and arrangement described herein and shown in the drawings. Furthermore, instead of the above mentioned germ-tight air-filters which may consist of cloth or metal, there may also be used air washers and in addition, it will also be possible to use air-washers in connection with germ-tight metal filters. One or more special heating plants may also be connected with the treatment plant and may be used at places where this should be desirable.

In the last-described construction of plant, air admission slots may also be provided—in case there should be a demand—alongside the windows which lead to the several cooling floors to permit passage of dry and pure air past said windows to protect the latter against getting fogged by action of the veils of air within the treatment space.

The invention claimed herein consists in the apparatus herein shown and described, the method being claimed in a pending divisional application, filed December 29, 1932, under Serial No. 649,398.

We claim:

1. A treatment plant for the manufacture of beer wort, comprising a room having a cooling floor for containing beer wort, a plurality of compartments beneath said room each in communication with the other, an air pressure fan in one compartment, for forcing air through the other compartment and room, and means intermediate the compartments for filtering air passed through said compartment and room, a valve-controlled conduit between the compartments in communication with the room, and air discharge means in the room controlling the escape of air therefrom, the air in said room being under positive pressure and distributed uniformly over the beer wort as a closed veil on said cooling floor.

2. In a treatment plant for beer wort, the combination of a cooling floor for the wort, walls enclosing said cooling floor to form a closed wort treatment space around the cooling floor, an air pressure chamber, means for delivering air under pressure from the air chamber to the closed wort treatment space adjacent to the underside of the cooling floor, and means cooperating with the cooling floor constraining the flow of air across the underside of the cooling floor and thence directing it over the exposed surface of the wort on the upper side of the floor whereby to regulate the cooling action of the air in accordance with the temperature of the wort.

3. In a treatment plant for beer wort, the combination of walls forming a closed wort treatment space around the beer wort, a cooling floor, means for supplying germ-free air to said closed treatment space, said means including slots at opposite ends of the cooling floor, said slots being positioned in proximity to the surface of the wort and being so disposed as to direct the germ-free air over the surface of the wort.

4. In a treatment plant for beer wort, the combination of a cooling floor for wort, walls forming a closed wort treatment space around said cooling floor, a pressure chamber containing germ-free air at over-pressure, conduits for supplying said air to said closed treatment space, means cooperating with the cooling floor for uniformly distributing the air in the form of a closed veil over the surface of the cooling floor and means for controlling the pressure and flow of the air admitted to the wort treatment space.

5. In a treatment plant for beer wort, the combination of walls forming a wort treatment space around the beer wort, with means for supplying germ-free air at over-pressure to said treatment space in proximity to the surface of the wort, and further means for passing air at over-pressure along the lower surface of the ceiling or upper wall of said space for keeping said upper wall or ceiling in dry condition.

6. A treatment plant for beer wort comprising a compartment having a cooling floor for wort therein, a second compartment in communication with the first compartment, a compartment having a spray cooler for wort therein in communication with the second mentioned compartment, means in the second mentioned compartment for forcing air under positive pressure into the other compartments, means for cleansing said air, and valved conduits for directing the cleansed air into either the spray cooling compartment or the cooling floor compartment or both, and means in the first compartment for restricting the escape of air whereby the air in said compartment is under positive pressure and overlying the wort on the cooling floor.

KARL BARTH.
KARL SCHULER.
JULIUS WANGER.